United States Patent Office 2,776,266
Patented Jan. 1, 1957

2,776,266

PARTIALLY HYDROGENATED FURFURAL-KETONE REACTION PRODUCTS WITH ALDEHYDES

Mortimer T. Harvey, South Orange, N. J., assignor to Harvel Research Corporation, a corporation of New Jersey No Drawing. Application December 3, 1952,
Serial No. 323,951

20 Claims. (Cl. 260—3)

This invention relates to novel compositions of matter and to methods for preparing them and also to novel products containing one or more of said novel compositions as components thereof and also to methods for producing said novel products. In one of its specific aspects the invention is directed to novel compositions A which, when 100 parts by weight thereof are mixed with 20 parts by weight of an alcoholic solution of paratoluene sulphonic acid, containing equal parts of alcohol and said acid, are capable of being heat converted, at 300° F. to the substantially solid and infusible state within 24 hours. Said compositions A comprising (I) an agent being an aldehyde or its equivalent, an aldehyde donor, under the aforesaid conditions, examples of which are formaldehyde, paraformaldehyde, trioxane, acetaldehyde, aldol, paraldehyde, glyoxal, furfuraldehyde, acrolein, etc., as well as the available reactive polymers thereof and (II) partially hydrogenated organic furfuraldehyde-ketone reaction products or such partially hydrogenated organic reaction products which were thickened or polymerized under acidic conditions, with the ratio of (II) to (I) being variable over wide limits, depending upon the end product desired and in general being 100 parts by weight of (II) to .5–250 parts by weight of (I) also depending upon the particular agent (I) employed. The organic reaction products before hydrogenation may be produced by reacting under alkaline conditions furfuraldehyde and a ketone having at least two hydrogen atoms on an alpha carbon, such as acetone, diacetone alcohol, methyl ethyl ketone, acetonyl acetone, cyclohexanone, mesityl oxide, etc.

I have discovered that said novel compositions of matter A offer a wide variety of unique products finding utility in many different fields. They may be employed as casting compositions, electrical insulating compositions, coating compositions for flooring, table tops, to surface wood and the like to provide protective coatings, as cold setting cements which may be employed as adhesives for tile and other floor coverings, as material for pipes and conduits, as coatings for pipes, conduits, tanks, etc., as joint material for pipes and the like, as tiles, etc. They may be used as impregnants and/or adhesives for the lamination of a wide variety of products such as glass fabric, glass matting, paper, wood, etc., and also may be so used in the production of wound tubings of said materials. They may also be used as components in friction elements such as brakelinings, clutch facings, etc. In the friction element field they may find application as binders for the asbestos fibers and other components thereof and/or they may be used in providing friction fortifier dusts therefor. They may also be used in combination with rubber materials. They may be combined with rubbery materials such as natural rubber, rubbery polymers of chloroprene, rubbery polymers of butadiene, rubbery copolymers of butadiene and styrene and rubbery copolymers of butadiene and acrylonitrile. The ratio by weight of composition A to the rubbery material may be 1–100 parts of composition A to 100–1 parts of rubbery material.

Prior to this invention, I produced partially hydrogenated furfuraldehyde-ketone organic reaction products and also other products by thickening or polymerizing said partially hydrogenated furfuraldehyde-ketone organic reaction products under acidic conditions. The methods for producing them are disclosed in my U. S. Patents 2,600,403 and 2,600,764 both issued June 17, 1952, which are made part hereof. They disclose partially hydrogenated products in both the thickened and unthickened states and methods for preparing them.

The furfuraldehyde-ketone reaction products may be prepared by employing any of the methods known to the art. One method which may be employed in the preparation of the starting materials is to first produce the unhydrogenated reaction products. For this purpose, the furfuraldehyde and ketone are mixed with each other and then there is added thereto a quantity of an alkaline material such as an aqueous solution of sodium hydroxide, potassium hydroxide, lime or the like. These three components are mixed with each other in an autoclave or closed unit and shortly after the mixtures take place an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason, an autoclave is recommended as the reacting unit. After the exothermic reaction has subsided, the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated, is a liquid, that is, it is pourable at 25° C. and for some purposes at the present time no greater than approximately 20,000 cps. at 25° C., and in all cases no lower than 50 cps. at 25° C. This reaction provides compounds which are mono and di-furfurylidene ketones, having the following formulae:

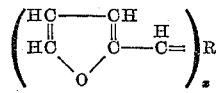

in which $x$ is a whole number selected from the group of 1 and 2, and R is a ketone lacking two of the hydrogen atoms normally on either one or both of its alpha carbons. These compounds are produced as a result of reaction between the furfuraldehyde and ketone wherein two hydrogen atoms on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%–60% by weight of the reaction mass.

Reference is hereby made to the United States Patent 2,363,829 which issued to me and Solomon Caplan on November 28, 1944, and particularly to those examples therein disclosing organic reaction products produced by reacting under alkaline conditions furfuraldehyde and a ketone having two hydrogen atoms on an alpha carbon, and all of those compositions as well as fractions thereof may be employed as the unhydrogenated reaction products herein. The resultant reaction mass or any desired fraction thereof, some of which are particular compounds and others of which may be the residues or mixtures of two or more of them, may be employed as the unhydrogenated materials. The unhydrogenated reaction products thus include the organic reaction masses, the distillates as well as the residual fractions which may be obtained by the heat distillation of the masses, and I prefer that the heat distillation of the masses be carried out so that the weight of the residual fraction is at least 60% and preferably 60–95% by weight of the organic reaction mass. All of said unhydrogenated reaction products may be hydrogenated in order that at least approximately 15% and no more than 65% of the carbon to carbon double bonds thereof have been saturated with hydrogen.

In the following general example the resultant reaction products produced by the general method heretofore described will be treated merely to disclose a general method for hydrogenation, it being understood that any of the other aforesaid compositions may be used in place thereof.

GENERAL EXAMPLE

Said resultant reaction mass may then be rendered substantially neutral in any convenient manner. This may be easily accomplished by adding thereto the requisite amount of an aqueous solution of an acidic agent, such as hydrochloric acid, sulphuric acid, lactic acid or the like. Generally it is preferable that the amount of acidic agent be such as to lower the pH of the mass to a value in the range of 3–7.4 and generally in the range of 3–6.

Following this step, the mass is substantially completely dehydrated. One method for doing this is to heat preferably under high vacuum, until all of the water and any unreacted components have been substantially completely distilled off.

This completely dehydrated reaction product may then be hydrogenated only partially by employing a nickel catalyst, maintaining the temperature thereof at a value of at least 120° C. and preferably in the range of 120–250° C. and the pressure thereof at a value of at least 35 lbs. per sq. in. and between 25–250 lbs. per sq. in. The nickel employed may be in a finely divided state and may be coupled with any suitable carrier such as a hydrogenated vegetable oil, hydrogenated cardanol, etc.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120° C. the external source of heat is removed, hydrogen gas is admitted thereto to provide a pressure of 25–250 lbs. per sq. in. whereupon hydrogenation takes place and is an exothermic reaction. The addition of the hydrogen is continued whereupon the temperature of the mass rises and is maintained at a level no greater than 250° C. and the pressure is maintained at a value no greater than 250 lbs. per sq. in. and generally between 30–75 lbs. per sq. in. The hydrogen is continuously added under the aforesaid conditions until the amount of added hydrogen per 40 lbs. of said reaction product is approximately 70–340 cubic feet measured at 20° C. and 760 mm. pressure. The hydrogen added and combined is approximately 15–65% of the quantity of hydrogen necessary for complete saturation of all the carbon to carbon double bonds thereof. The hydrogenation is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50–100% saturated with hydrogen with 0–50% saturation with hydrogen of the carbon to carbon double bonds in the furane ring.

When the mass to be hydrogenated is of a very high viscosity, for example, over 20,000 cps. at 25° C. I first dissolved the mass in a solvent, such as a high molecular weight ketone and then hydrogenated under the aforesaid conditions.

The partially hydrogenated reaction mass may be polymerized or thickened under acidic conditions to provide polymerized products of any desired viscosity. In this manner, slightly to highly polymerized products having unusual stability characteristics may be obtained. These polymerized or thickened products are characterized by when maintained at 300° F. for 24 hours they are in the substantially infusible state at the end of that period. In general, these polymers, either of low or high molecular weight, may be produced by adding to the hydrogenated mass or any fraction thereof an acidic catalyst such as sulphuric acid, phosphoric acid, hydrochloric acid, diethyl sulphate, zinc chloride, boron trifluoride, or the like to provide an acidic condition such that the pH of the mass is in the range of approximately 1–3.5. In factory practice the pH of the mass is in the range of approximately 3 or slightly below. Such acidified mass is heated to a temperature of 180° F. or above, and generally around 220–350° F. until the polymerization or thickening has reached the desired degree as evidenced by increasing viscosity which in all cases is at least 100% greater than the viscosity of the hydrogenated mass at 25° C. before said polymerization or thickening. In all cases, I prefer that the polymerization be discontinued before the mass, when at 100° C., is in the solid state and in all cases in the practice of this invention, the polymerized or thickened hydrogenated products as well as the unpolymerized or unthickened hydrogenated products are in the liquid condition at 100° C., that is, they will exhibit flow at 100° C.

The following Examples 1–7 are given merely to further illustrate the methods for providing some of the starting materials and are not to be construed in a limiting sense, all parts given by weight unless otherwise indicated.

*Example 1*

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical mixer or agitator which maybe in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge consisting of 40 lbs. furfuraldehyde and 24 lbs. acetone. Then to the mass in the autoclave there is added a second increment of said sodium hydroxide solution equal in volume to the first addition. After a few minutes the temperature of the mass will, due to the exothermic reaction, rise to approximately 165–170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180–195° F. Then the mass within the autoclave may be heated by means of a steam coil located therein and through a jacket carried thereby to maintain the temperature of the mass between approximately 185–190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the same to a temperature of 220° F. with or without vacuum, yielding approximately 300 lbs. of dehydrated substantially neutral material known as product A, whose vicosity at 25° C. is 92 cps., and having a specific gravity at 25° C. of 1.150. When this material, product A, is distilled at a pressure of approximately .1 mm. of mercury pressure a fraction (37%) weighing approximately 110 lbs. comes off at temperatures in the range of 70–85° C. and is hereinafter known as fraction I, apparently essentially monofurfurylidene-acetone leaving behind a residual fraction known as product RFA, and a fraction (47%) measuring approximately 140 lbs. comes off in the temperature range of 150–165° C. and hereinafter is known as fraction II. The residue measuring approximately 50 lbs. is a brittle solid on cooling. Analysis of fraction I established a carbon content of 70.3% and hydrogen of 5.48% which corresponds to the carbon and hydrogen values of furfural acetone having the following formula:

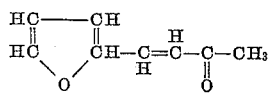

Analysis of fraction II established a carbon content of 73.07% and a hydrogen content of 4.58% corresponding to the carbon and hydrogen values of difurfurylidene acetone having the following formula:

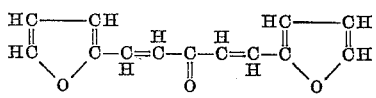

*Example 1A*

40 lbs. of product A is placed in a 10-gallon closed unit equipped with a high speed propeller. Then 1 lb. of a catalyst and carrier combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per sq. in. Hydrogen is continuously admitted to the mass and hydrogenation takes place exothermically and now the external source of heat is removed therefrom. By controlling the speed of addition of the hydrogen to the mass, the temperature is maintained at approximately 200° C. and the pressure of approximately 50 lbs. per sq. in. The temperature during hydrogenation may also be controlled by external cooling. The hydrogen addition is terminated when no more hydrogen is taken up under these conditions within a period of about 30 minutes. The quantity of hydrogen taken up in this particular hydrogenation step apparently due to early poisoning of the catalyst amounted to approximately 145 cubic feet which corresponds roughly to the quantity of hydrogen required to saturate only the unsaturated carbon to carbon atoms outside of the furane ring.

This hydrogenated product A, hereinafter known as HA is still a thin liquid and may be distilled if desired to provide separate various fractions thereof. By distilling this hydrogenated product A at 0.3 mm. of mercury pressure, a fraction distilled off up to 100° C. and was collected and amounted to 32%; a second fraction amounting to 41% distilled off and was collected at 120–170° C. That fraction which distilled off up to 100° C. is hereinafter known as product HA–1 and consisted essentially of a compound having the following formula:

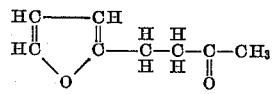

The second fraction which distilled off at 120–170° C. is hereinafter known as product HA–2 and consisted essentially of a compound having the following formula:

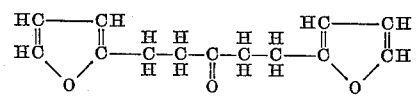

The residue known as HA–3 upon cooling was a brittle black solid.

*Example 2*

By using the same procedure as that set forth in Example 1, and substituting 180 lbs. of methyl ethyl ketone for the 144 lbs. of acetone, and terminating hydrogen addition when approximately 150 cu. ft. of hydrogen have been taken up, there may be produced a novel hydrogenated product. This hydrogenated product known as product HB may be distilled to provide fractions HB–1 and HB–2 respectively, chiefly consisting of the following compounds:

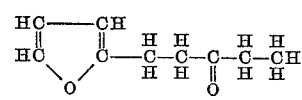

and

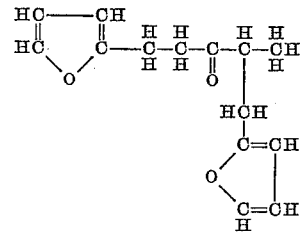

and the resinous residue HB–3 of more than 5% of the hydrogenated mass.

*Example 3*

By using the same procedure as that set forth in Example 2, and substituting 240 lbs. of diacetone alcohol for 180 lbs. methyl ethyl ketone, there may be produced a novel hydrogenated product known as product HC. This hydrogenated product HC may be distilled to provide fractions HC–1 and HC–2 respectively, consisting chiefly of the following compounds:

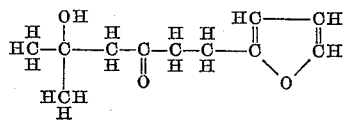

And

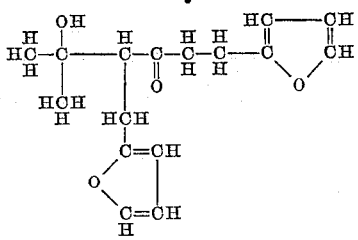

and a resinous residue HC-3 of more than 5% of the hydrogenated mass.

*Example 4*

Following the same procedure as that set forth in Example 1A and using fresh catalyst and terminating the hydrogenation after approximately 70, 100, 150, 175, 210 and 235 cu. ft. of hydrogen were taken up in six different 40 lb. batches of product A, I obtained products HD, HE, HF, HG, HH, HI, differing from each other in the degree of hydrogen saturation.

*Example 5*

Following the same procedure as that set forth in Example 1A and employing fresh catalyst, 235 cu. ft. of hydrogen were taken up in a 40 lb. batch of product A. Then the same amount of fresh catalyst, .25 lb. powdered nickel, was added thereto and hydrogenation continued until a total of 340 cu. ft. of hydrogen was taken up. This product is known as product HJ.

*Example 6*

Following the same procedure as that of Example 1A and employing fraction I of Example 1 in place of product A, and terminating the hydrogenation after 1.3 and 1.8 moles proportionately of hydrogen were taken up by 1 mole proportion of said fraction, approximately 95 and 130 cu. ft. of hydrogen per 40 lbs. of fraction I. The hydrogenation above the 1.3 mole proportion proceeded with difficulty. These two hydrogenated products are HK and HL and were respectively about 43% and 60% hydrogenated at the carbon to carbon double bonds.

*Example 7*

Following the same procedure as that of Example 1A and employing fraction II of Example 1 in place of product A, and 1 to 4 moles of hydrogen addition were taken up. Above 2 moles of hydrogen addition, additional increments of nickel catalyst were used. Various samples of 1, 2, 3 and 4 moles of hydrogen addition products are known as HM, HN, HO and HP respectively, and respectively were approximately 15, 30, 50 and 65% hydrogen saturated at the carbon to carbon double bonds.

All of these various partially hydrogenated products, examples of which have been hereinbefore set forth, may be polymerized or thickened in the manner heretofore generally described to provide polymers thereof and having a viscosity at 25° C. at least 100% greater than the partially hydrogenated products before said polymerization under acidic conditions.

The method which I have employed for ascertaining the pH of the various materials herein is that commonly used in the art for materials that are substantially free of water and substantially insoluble in water, and is as follows: About a 10-20 cc. sample of the material, and in this case the partially hydrogenated product together with the acidic agent, whose pH is to be ascertained is placed in a test tube containing about an equal volume of distilled water. The mixture is heated to about boiling while being shaken and then allowed to stand and come to room temperature. Then this aqueous mass is tested with a pH test paper commonly employed in the art.

According to this invention, said partially hydrogenated furfuraldehyde-ketone reaction products, illustrative examples of which are products HA, HA-1, HA-2, HB, HB-1, HB-2, HC, HC-1, HC-2 and HD-HP, as well as any of them polymerized or thickened under acidic conditions, may be combined with one or more of said agents (I) in the proportions heretofore set forth.

In one of its more specific aspects, the invention is directed to intimately combining agent (I) with (II) a partially hydrogenated reaction product, liquid at 100° C. and selected from the group consisting of (a) partially hydrogenated monofurfurylidene-ketone, (b) partially hydrogenated difurfurylidene-ketone, (c) partially hydrogenated organic reaction masses, said reaction masses before hydrogenation having a viscosity of at least 50 cps. at 25° C. and produced by reacting under alkaline conditions furfuraldehyde and a ketone having at least two hydrogen atoms on an alpha carbon, (d) partially hydrogenated residual fractions of said reaction masses before hydrogenation, said residual fractions before hydrogenation obtained by heat distillation of said reaction masses and measuring by weight at least 60% of said reaction masses, (e) fractions obtained by the heat distillation of (c), (f) thickened products produced by polymerizing or thickening (a)–(e) under acidic conditions, and (g) mixtures of two or more of (a)–(f). The monofurfurylidene-ketone, difurfurylidene-ketone, organic reaction masses and residual fractions thereof are hydrogenated to at least approximately 15% and no more than approximately 65% of the hydrogen necessary to completely saturate with hydrogen the carbon to carbon double bonds thereof to provide (a)–(d). The ratio by weight of (I) to (II) is .5–100 to 250–100.

Said compositions A consisting of (I) and (II) intimately combined with each other in the aforesaid proportions to provide substantially uniform compositions may first be converted to reaction products wherein (I) reacts with (II) to provide resinous reaction products B in the intermediate state and capable of being converted to the substantially solid and infusible state under the influence of heat and/or acidic reagent. By the intermediate state, I mean that products B, are in the liquid, semi-solid or solid state and in any case will be in the liquid state or capable of exhibiting flow at 100° C., and such products are capable of being converted to the infusible state when maintained at 300° F. under pH conditions of 1.5 for 8 hours.

When furfuraldehyde is the agent (I) employed in the aforesaid compositions A, it may be used in all of the proportions heretofore set forth. I prefer that the other agents (I) and especially those which do not themselves resinify at a pH of 1.5 be present in equivalents of furfuraldehyde based upon the amount of furfuraldehyde in the aforesaid proportions. However, for most purposes the amount of said reagents which do not themselves resinify under the aforesaid conditions, I employ such amounts as to be the equivalents of furfuraldehyde measuring 0.5–100 parts by weight of furfuraldehyde for each 100 parts of (II).

Any one or a combination of two or more of agents (I) and any one or two or more of (II) may be placed in a vessel in the proportions heretofore set forth for reaction under the influence of heat. To promote the speed of reaction it is preferable that the reaction be carried out in the presence of an acidic catalyst, and if desired the external heat may be completely omitted. Among some of the catalysts which may be employed are diethyl sulphate, sulphuric acid, hydrochloric acid, hydrobromic acid, paratoluene sulphonic acid, boron trifluoride, mono-, butyl- and propyl phosphate, phenol sulphonic acid, xylenol sulphonic acid, cresol sulphonic acid, naphthanol sulphonic acid etc. and are present in catalytic proportions.

The following Examples 8–18 are a number of illustrative examples of various (I)–(II) reaction products.

Example 8

600 lbs. of product HA and 12 lbs. of paraform are charged into a jacketed reacting vessel and are mixed. Then while being continuously agitated, there is charged into said mix about 1.5 lbs. of diethyl sulphate which is uniformly mixed therethrough. This mixture is now heated to approximately 135° C. whereupon an exothermic reaction ensues. External heating is discontinued. The mixture is maintained at this temperature while reacting until the desired degree of reaction has taken place as evidenced by the extent of thickening of the mass. When the viscosity of a sample at 25° C. meets the desired specification which may vary from 100 to 200,000 cps., for example, a quantity of alkali such as lime is charged therein to neutralize the mass, and the mass externally cooled and such products are hereinafter known as products R-1. Said products R-1 may be converted to the substantially solid and infusible state by heat or without heat if an acidic catalyst is added thereto.

Example 9

Employing the same procedure as that set forth in Example 8 and instead of product HA there is used 100 lbs. of product HB-1, only 2 lbs. of paraform, and in place of the diethyl sulphate, .3 lbs. mono butyl phosphoric acid is used to provide products R-2.

Example 10

Employing the same procedure as that set forth in Example 8 and in place of product HA employing 100 lbs. of product HC-2, only 1.5 lbs. of paraform and for the diethyl sulphate substituting 2.2 lbs. of n-proply sulphate acid there is produced products known as R-3.

Example 11

600 lbs. of product HA are charged into a jacketed reacting vessel and 1.5 lbs. of diethyl sulphate are added thereto and mixed therewith. The mixture is heated to approximately 140° C., whereup an exothermic reaction ensues. The mixture is maintained at this temperature while polymerizing until the desired degree of polymerization takes place, and after it has so thickened or polymerized that a sample thereof has a viscosity at 25° C. between 2–20 times or more greater than that of product HA before said polymerization. At that stage, there is added thereto about 12 lbs. of paraform which is mixed therewith, whereupon reacting by the paraform and the acid polymerized HA takes place and continues as evidenced by a further thickening of the mass. When the viscosity of the reaction products meets the desired specification, which may go as high as 200,000 cps. at 25° C. or higher, a quantity of alkali such as lime sufficient to neutralize the mass is added thereto, and the mass is externally cooled and products so produced are hereinafter known as products R-4. These products like the other R products described herein are all liquid at 100° C. and may be converted to the substantially solid and infusible state by employing heat or without heat if an acidic catalyst is added thereto.

Example 12

Employing the same procedure as that set forth in Example 11, but using the components as set forth in Example 9 and in the proportions set forth in Example 9, products R-5 may be produced.

Example 13

Employing the same procedure as that set forth in Example 11, but using the components as set forth in Example 10 and the proportions set forth in Example 10, novel products R-6 may be produced.

Example 14

Following the same procedure as that set forth in Examples 8–13 but substituting any of the other various products (II) and any of the other agents (I), and any desired acidic catalysts, a wide variety of novel and highly useful products may be obtained.

Example 15

In a container, 100 lbs. of product HA is mixed together with 100 parts of furfuraldehyde to provide an intimately combined substantially uniform mass. In a second container is uniformly mixed 400 lbs. of finely divided calcined petroleum carbon (finer than 100 mesh) and an alcoholic solution containing 5–20 lbs. of acid catalyst such as paratoluene sulfonic acid. This mix is heated to drive off any water and the alcohol to provide a substantially dry acidic catalyzed carbon, containing the acid catalyst substantially uniformly distributed throughout the carbon. Then the entire mass of the acid catalyzed carbon is charged into the HA-furfuraldehyde combination and the mixture is stirred to homogeneity. This cold mix may be spread, troweled or in any other manner worked and spread on a base such as a floor base or the like and is allowed to set for 24–48 hours after which it will be found to be a tough, wear resistant and chemical resistant coating which is in the substantially infusible or end state. When applied as a floor coating material, it may be of any desired thickness from about $\frac{1}{16}$ inch to one-half inch or more depending upon what is desired. It may be used in like manner to coat either the interior or exterior of tank walls, the top and/or bottom of table tops and the like. It may be used either alone or in combination with fillers such as inorganic fillers as well as asbestos and also, if desired, with organic fillers and other materials for the manufacture of cold setting tile, brick, tubing, conduits or the like and also may be used as a cement for cementing tile, brick, pipe joints, etc.

Example 16

200 parts by weight of product HA and 100 parts by weight of furfuraldehyde are mixed together until a homogeneous mass is obtained. Then to said mass is added 3 parts by weight of a solution consisting of equal parts of alcohol and paratoluene sulfonic acid. This solution is added to the HA-furfuraldehyde mass and is admixed therewith to homogeneity whereupon an exothermic reaction is initiated and is allowed to proceed for about 20 minutes and then the mass is heated to about 105° C. and subsequently allowed to cool to 30° C. The viscosity of the resultant reaction mass may vary from 300–5000 cps. at 25° C. depending upon the time of reaching and holding the mass at 105° C. This resultant product at room temperature may be employed as a binder for carbon, silica, woven glass cloth or matting, and generally when employed for these purposes the binder together with the other material may be maintained at a temperature of approximately 300° F. for a period of about 24 hours to convert it to the substantially solid and infusible state.

Example 17

200 parts of the resultant product of Example 16 having a viscosity of 300–5000 cps. at 25° C. is mixed with 100 parts of furfuraldehyde to provide a substantially uniform mass. Then there is added to said mass 400 parts of acid catalyzed, finely divided carbon containing 5–20 parts of paratoluene sulfonic acid as in Example 15 to provide a cold mass which finds substantially the same applications as those set forth in Example 15.

Example 18

Following the same procedure as that set forth in Examples 15–17 but substituting any of the various products (II) and any of the other agents (I) and any desired acid catalyst and using the broad proportions heretofore set forth, a wide variety of novel and highly useful products may be obtained. Although the other agents (I)

may be used the reaction is quite slow when compared with formaldehyde, paraformaldehyde or furfuraldehyde. The latter gives a quick hardness whereas the others sometimes require an extended period of time at room temperature to harden.

When furfuraldehyde is employed as agent (I), I prefer that for some purposes, the floor, tank and table top coatings and like fields, that the ratio by weight of (II) to (I) be 100 parts of (II) to 10–250 parts of (I) and in most cases in those fields 100 parts of (II) to 10–150 parts of (I), and that the ratio by weight of the sum of the weights of (II) and (I) either reacted or unreacted, to the weight of the carbon be in the range of 100 parts of said sum of said weights to 50–400 parts of the carbon, and the quantity of acidic catalyst measuring about 0.5–10% of the total of the sum of said weights and carbon depending upon the particular catalyst employed and the desired hardening time.

Also according to this invention any one or a combination of two or more of said rubbery materials may be combined with one or a combination of two or more of said reaction products, illustrative examples of which are shown in Examples 8–14 and 16 in a number of different manners and generally with other components such as fillers, vulcanizers, accelerators, etc. and subsequently cured for obtaining novel and improved products. By employing these various combinations it is possible to produce improved hard rubber stocks having good ozone resistance and other novel and highly useful compositions. In general the quantity of the former to the latter may vary over a wide range and in the proportions heretofore set forth.

A number of different methods and apparatus may be employed for providing said novel compositions. For example, a rubber mill may be used or a Banbury mixer or other type mixer may be employed for this purpose. The following examples are given merely as illustrative examples of some of the novel compositions which may be produced, all parts given by weight unless otherwise specified and none of these examples is to be regarded by way of limitation.

*Example 19*

100 parts of a copolymer of butadiene and styrene (GRS–65) is placed on a rubber mill and is milled until it is sufficiently broken down and thereafter milling is continued and the following components are added and blended in the sequence below set forth: 5 parts of zinc oxide, 50 parts of calcium carbonate, 10–25 parts R–1, 40 parts sulfur and 5 parts mercapto benzothiazole. By this milling operation these components are so blended together with the GRS–65 so as to provide a substantially uniform mixture. The product may be stripped off the mill and molded into desired shape and size and cured under heat and pressure.

*Example 20*

100 parts of "Neoprene–GN" (polychloroprene) is placed on a rubber mill and there were successively blended therewith the following components: 0.5 part of stearic acid, 50 parts "SRF Black" (carbon black), 2 parts of phenyl beta naphthylamine (anti-oxidant), 10 parts of product R–2, 5 parts of zinc oxide and 4 parts of magnesium oxide. At the end of the last blending operation, the mass is substantially homogeneous and is now stripped from the mill. This resultant mass may be extruded, molded or in another manner formed and subsequently cured at 275–325° C. for a period of 60–5 minutes.

*Example 21*

100 parts of "Hycar OR–25" (copolymer of butadiene and acrylonitrile) was broken down on the mill and there was successively blended therewith the following components: 1 part of stearic acid, 60 parts of "SRF Black" (carbon black), 12 parts of product R–3, 2 parts of sulfur, and 1.5 parts of benzothiazyl disulphide. At the end of this blending operation, the same subsequent procedure is followed as in Example 20 to provide a wide variety of novel products.

*Example 22*

100 parts of "GRS SP–65" (copolymer of butadiene and styrene) is placed on a rubber mill and there was successively blended therewith the following components: 1 part of stearic acid, 50 parts of "SRF Black" (carbon black), 5 parts of product R–4, 1 part of phenyl beta naphthylamine, 2 parts of sulphur, 1.5 parts of mercapto benzothiazole and 0.15 part of zinc dimethyl dithiocarbamate. At the end of this blending operation, the same subsequent procedure is followed as in Example 20 to provide a wide variety of novel products.

*Example 23*

100 parts of natural rubber (smoked sheet) is placed on a rubber mill, broken down and there is blended therewith the following components: 1 part of stearic acid, 0.5 part of phenyl beta naphthylamine, 4 parts zinc oxide, 75 parts Dixie clay, 7 parts of product R–5, 20 parts litharge, 3 parts sulphur, and 1.5 parts of benzothiazole disulphide. At the end of this blending operation, the same subsequent procedure is followed as in Example 20 to provide a wide variety of novel products.

*Example 24*

Employing the same procedure and materials as set forth in Examples 19–23 but for the various specific R products therein set forth there may be substituted any of the reaction products of (I) and (II), a number of novel and highly useful products may be obtained.

The following Examples 25–28 illustrate the general method for producing brake linings with said compositions A.

*Example 25*

A length of woven or pressed, felted or matted asbestos of the desired dimensions and of the type commonly employed in the production of brake linings is first de-aerated and dehydrated and then soaked in a bath of one or a mixture of two or more of said compositions A, unreacted or reacted to the liquid intermediate state to coat and/or impregnate the fibers thereof. This may be accomplished by placing a length of said material in a chamber which is heated and maintained under vacuum; then into said chamber is added said composition A with a small amount of an acidic catalyst which is maintained therein under pressure of about 100 lbs. per sq. in. and at a temperature of about 75° F.–200° F. The viscosity of said composition A is preferably low and may be between about 200–600 cps. at 25° C. Then after about 1 to 2 hours of soaking the excess composition A is removed and the composition A-soaked asbestos material is allowed to drain overnight. Subsequently it is cured for about 24 hours in a temperature graduated oven starting at about 150° F. and reaching about 450° F. in that time. Upon removal from the oven and allowing to cool to room temperature, this cured coated and/or impregnated material will be found to be substantially dry, may be readily cut into the desired lengths and is sufficiently flexible to be formed around a brake drum and provides an improved brake lining. Said composition A will be found to have converted to a substantially dry infusible and solid resinous composition having good frictional properties.

For the aforesaid purpose, I prefer to employ furfuraldehyde as the agent (I) in compositions A used therein, with the ratio of (II) to furfuraldehyde by weight being 100 parts of the former to 5–250 parts of the latter.

If desired, said soaking bath may be made thinner by the addition thereto of a solvent such as methyl ethyl ketone. When a solvent is employed, the soaked material after draining is preferably subjected to a heating operation to remove the solvent therefrom before curing. Whatever type of soaking bath employed, there may also be included therein a quantity of an oil soluble heat reactive phenol-aldehyde resin, and preferably a thermosetting heat reactive substituted phenol-formaldehyde resin and the quantity by weight of said resin added thereto may be between about 10%–80% based on the quantity by weight of said composition A. The use of said pehnol-aldehyde resin therein imparts increased hardness to the resultant cured brake lining. To impart increased softness, in place of said phenol-aldehyde resin, there may be employed the same quantity of a heat polymerizable and drying oil such as China-wood oil, linseed oil, etc.

Instead of omitting all of the phenol-aldehyde resin, said bath may contain both said oil and said phenol-aldehyde resin. In this case there may be prepared a solution of one of said phenol-aldehyde resins in said oil, with the ratio of the quantity of said phenol-aldehyde resin in said oil being in the range of 25–100 to 75–25. The solution may be obtained by heating a mixture of fusible phenol-aldehyde resin and said oil at a temperature of approximately 150° F. until solution is completed. The ratio of the amount of said phenol-aldehyde resin-oil solution in said bath to the quantity of said composition A may be in the range of 25–100 to 75–25. Also included in any one of said baths and with or without said phenol-aldehyde resins and/or said oils may be a quantity of a normally solid polyvinyl acetal with the ratio by weight of the quantity of said composition A to the quantity of the polyvinyl acetal being in the range of 1–100 to 12–100.

If desired, there may also be included in said bath a quantity of various other materials heretofore mentioned. In any of the combinations of materials as set forth, the final product after curing at the aforementioned curing temperatures results in an improved brake lining of asbestos fibers and a binder whose outer surface is a substantially dry, solid, infusible resinous composition having good frictional properties.

*Example 26*

Instead of employing a length of said asbestos material to be impregnated and/or coated with said materials as set forth in Example 25, a batch of asbestos fibers may be added directly thereto, mixed therewith, shaped and cured. For example, 100 parts of one of said compositions A and, where required, a solvent are placed in a mixer of the dough or cake mixer type and subjected to a mixing operation until there is a solution or substantially uniform distribution of these components with respect to each other. Then to said mass is added 200 parts of asbestos fiber together with additional solvent of such quantity that mixing may be done with comparative ease. Any of the other ingredients set forth in Example 25 may be added thereto and preferably in the proportions indicated therein and mixed therewith to provide a substantially uniform mix. After complete mixing the mass is removed from the mixer, the solvent is evaporated therefrom at temperatures of about 120° F. to about 140° F. and then is rolled or extruded into ribbons of the proper thickness and width and these ribbons are cured in temperature graduated ovens between about 150° F.–400° F. for a period of about 24 hours. After curing, these ribbons may be cut and ground to the desired dimension to provide brake linings having matted asbestos fibers with a binder therefor which has good frictional properties and which is a substantially solid and infusible composition.

*Example 27*

100 parts of rubber may be milled on a rubber mill and in the course of said milling there may be added thereto between 10–200 parts of one of said novel compostions A having a viscosity between 2,000–20,000 cps. at 25° C. The milling is continued until there is a substantially uniform distribution of said composition A into said rubber. Then this milled product may be cut into small pieces and placed in a swelling agent such as toluol. After standing for about from 1 to 3 days in said toluol, a fluid gelatinous mass is obtained. This mass may then be mixed with asbestos, sulphur and the usual rubber accelerators in the proportion of about 3 parts of asbestos to 1 of said solids in said mass. The swelling agent is then removed from said mixture by subjecting the same to a temperature of about 125° F.–150° F. and the resulting product is sheeted and formed into the desired shape, then cured in low pressure molds for approximately 1 hour and further heated in a graduated oven ranging from 150° F.–400° F. over a 24 hour period.

Instead of natural rubber, rubbery polymers of chloroprene, the rubber copolymers of butadiene and styrene or the rubbery copolymers of butadiene and acrylonitrile may be employed and when either of these is employed, xylol, for example, is used as the swelling agent. In any case, the resulting cured product includes a binder for the asbestos fibers which binder is a substantially infusible solid mass.

In commercial production these various brake linings include various fillers and modifying agents, such as barytes, cork, carbon black and the like heretofore generally employed in the production of brake linings and well known to the industry.

*Example 28*

Instead of employing said composition A as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of one of said compositions A together with 5% toluene sulphonic acid is poured into shallow pans and cured for 24 hours at about 300° F.–400° F. After that period, it will have been converted to the substantially dry, solid and infusible state. This dry mass is then comminuted in any convenient manner, by using for example differential rolls or a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of brake linings. The usual manner is to incorporate in a brake lining of asbestos fibers, 8%–20% of dust based on the weight of the finished product, about double that amount of a binder, together with barytes, carbon black and other materials which may be used therewith.

This application is a continuation-in-part of my application Ser. No. 285,540, filed May 1, 1952, subsequently abandoned and in turn being a continuation in part of my application Ser. No. 274,080, filed Febbruary 29, 1952, which issued into Patent No. 2,600,764 on June 17, 1952, and my application Ser. No. 144,594, filed February 16, 1950 which issued into Patent No. 2,600,403 on June 17, 1952. Said application Ser. No. 274,080 in turn is a continuation-in-part of said application Ser. No. 144,594 which in turn is a continuation-in-part of my application Ser. No. 740,472, filed April 9, 1947, and subsequently abandoned, and of my application Ser. No. 732,124, filed March 3, 1947, and subsequently abandoned. Said application Ser. No. 740,472 is a continuation-in-part of said application Ser. No. 732,124.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel compositions of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim is:

1. A novel composition of matter being capable of being converted to the substantially solid and infusible state when a 100 gram sample thereof in substantially uniform admixture with 20 grams of an alcoholic solution consisting of equal parts by weight of alcohol and paratoluene sulfonic acid is maintained at 300° F. for 24 hours, said novel composition of matter comprising an intimate combination of (I) an aldehyde and (II) a partially hydrogenated organic reaction product normally liquid at 100° C. and selected from the group consisting of (a) partially hydrogenated mono-furfurylidene-ketone, (b) partially hydrogenated difurfurylidene-ketone, (c) partially hydrogenated organic reaction masses, said organic reaction masses before hydrogenation having a viscosity of at least 50 cps. at 25° C. and produced by reacting under alkaline conditions furfuraldehyde and a ketone having at least two hydrogen atoms on an alpha carbon, (d) partially hydrogenated residual fractions of said reaction masses, said fractions before hydrogenation obtained by heat distillation of said reaction masses and measuring by weight at least 60% of said reaction masses, (e) residual fractions obtained by heat distillation of (c) and measuring at least 60% by weight of (c), (f) polymerized products produced by polymerizing (a)-(e) respectively under acidic conditions, said (a)-(d) respectively produced by hydrogenating mono-furfurylidene-ketone, difurfurylidene-ketone, said organic reaction masses and said residual fractions of said organic reaction masses to an extent at least approximately 15% and no more than approximately 65% of that necessary to completely saturate with hydrogen the carbon to carbon double bonds thereof.

2. A composition of matter defined in claim 1, with said aldehyde (I) being furfuraldehyde.

3. A novel composition of matter defined in claim 1, with the ratio by weight of said aldehyde to (II) being about 5–250 parts of aldehyde to 100 parts of (II), and said aldehyde being furfuraldehyde.

4. A novel composition of matter comprising carbon particles and acidic catalyst admixed with a composition defined in claim 1, the ratio by weight of said composition defined in claim 1 to said carbon particles being in the range of 100 of the former to 50–400 parts of the latter, said novel composition of matter being converted to the substantially solid and infusible state at room temperature.

5. A floor base carrying a protective covering comprising a composition of matter comprising carbon particles and acidic catalyst admixed with a composition defined in claim 1, the ratio by weight of said carbon particles to said composition defined in claim 1 being in the range of 50–400 parts of the former to 100 parts of the latter, said compositions of matter converted to the solid state.

6. A novel composition of matter comprising carbon particles and acidic catalyst admixed with a composition defined in claim 1, with the ratio by weight of said aldehyde to (II) being about 5–250 parts of aldehyde to 100 parts of (II), and said aldehyde being furfuraldehyde, the ratio by weight of said composition defined in claim 1 to said carbon particles being in the range of 100 of the former to 50–400 parts of the latter, said novel composition of matter being converted to the substantially solid and infusible state at room temperature.

7. A floor base carrying a protective covering comprising a composition of matter comprising carbon particles and acidic catalyst admixed with a composition defined in claim 1, with the ration by weight of said aldehyde to (II) being about 5–250 parts of aldehyde to 100 parts of (II), and said aldehyde being furfuraldehyde, the ratio by weight of said carbon particles to said composition defined in claim 1 being in the range of 50–400 parts of the former to 100 parts of the latter, said compositions of matter converted to the solid state.

8. A novel composition of matter being capable of being converted to the substantially solid and infusible state when a 100 gram sample thereof in substantially uniform admixture with 20 grams of an alcoholic solution consisting of equal parts by weight of alcohol and paratoluene sulfonic acid is maintained at 300° F. for 24 hours, said novel composition of matter comprising an intimate combination of an aldehyde and (II) a partially hydrogenated organic reaction mass normally liquid at 100° C. said mass before hydrogenation produced by reacting under alkaline conditions furfuraldehyde and a ketone having at least two hydrogen atoms on an alpha carbon, said reaction mass being hydrogenated to an extent at least approximately 15% and no more than approximately 65% of that necessary to completely saturate with hydrogen the carbon to carbon double bonds thereof.

9. A composition of matter defined in claim 8 with said aldehyde (I) being furfuraldehyde.

10. A novel composition of matter defined in claim 8 with the ratio by weight of said aldehyde to (II) being about 5–250 parts of aldehyde to 100 parts of (II), and said aldehyde being furfuraldehyde.

11. A novel composition of matter being capable of being converted to the substantially solid and infusible state when a 100 gram sample thereof in substantially uniform admixture with 20 grams of an alcoholic solution consisting of equal parts by weight of alcohol and paratoluene sulfonic acid is maintained at 300° F. for 24 hours, said novel composition of matter comprising an intimate combination of (I) an aldehyde and (II) a partially hydrogenated organic reaction mass which was thickened under acidic conditions and is normally liquid at 100° C. said mass before hydrogenation produced by reacting under alkaline conditions furfuraldehyde and a ketone having at least two hydrogen atoms on an alpha carbon, said reaction mass being hydrogenated to an extent at least approximately 15% and no more than approximately 65% of that necessary to completely saturate with hydrogen the carbon to carbon double bonds thereof.

12. A composition of matter defined in claim 11 with said aldehyde (I) being furfuraldehyde.

13. A novel composition of matter defined in claim 11 with the ratio by weight of said aldehyde to (II) being about 2–250 parts of aldehyde to 100 parts of (II), and said aldehyde being furfuraldehyde.

14. An organic reaction product produced by reacting under acidic conditions (I) an aldehyde and (II) a partially hydrogenated organic reaction product normally liquid at 100° C. and selected from the group consisting of (a) partially hydrogenated monofurfurylidene-ketone, (b) partially hydrogenated difurfurylidene-ketone, (c) partially hydrogenated organic reaction masses, said organic reaction masses before hydrogenation having a viscosity of at least 50 cps. at 25° C. and produced by reacting under alkaline conditions furfuraldehyde and a ketone having at least two hydrogen atoms on an alpha carbon, (d) partially hydrogenated residual fractions of said reaction masses, said fractions before hydrogenation obtained by heat distillation of said reaction masses and measuring by weight at least 60% of said reaction masses, (e) residual fractions obtained by heat distillation of (c) and measuring at least 60% by weight of (c), (f) polymerized products produced by polymerizing (a)-(e) respectively under acidic conditions, said (a)-(d) respectively produced by hydrogenating monofurfurylidene-ketone, difurfurylidene-ketone, said organic reaction masses and said residual fractions of said organic reaction masses to an extent at least approximately 15% and no more than approximately 65% of that necessary to completely saturate with hydrogen the carbon to carbon double bonds thereof.

15. An organic reaction product defined in claim 14 with said aldehyde (I) being furfuraldehyde.

16. An organic reaction product produced by reacting under acidic conditions (I) an aldehyde and (II) a partially hydrogenated organic reaction mass normally liquid at 100° C. and said mass before hydrogenation produced by reacting under alkaline conditions furfuraldehyde and a ketone having at least two hydrogen atoms on an alpha carbon, said reaction mass being hydrogenated to an extent at least approximately 15% and no more than approximately 65% of that necessary to completely saturate with hydrogen the carbon to carbon double bonds thereof.

17. An organic reaction product produced by reacting under acidic conditions (I) an aldehyde and (II) a partially hydrogenated organic reaction mass which was thickened under acidic conditions and is normally liquid at 100° C. said mass before hydrogenation produced by reacting under alkaline conditions furfuraldehyde and a ketone having at least two hydrogen atoms on an alpha carbon, said reaction mass being hydrogenated to an extent at least approximately 15% and no more than approximately 65% of that necessary to completely saturate with hydrogen the carbon to carbon double bonds thereof.

18. A novel composition of matter comprising (III) a rubbery material selected from the group consisting of natural rubber, rubbery polymers of chloroprene, rubbery homopolymers of butadiene, rubbery copolymers of butadiene and styrene, rubbery copolymers of butadiene and acrylonitrile and mixture of at least two of them, intimately combined with an organic reaction product defined in claim 14.

19. A novel composition of matter comprising (III) a rubbery material selected from the group consisting of natural rubber, rubbery polymers of chloroprene, rubbery homopolymers of butadiene, rubbery copolymers of butadiene and styrene, rubbery copolymers of butadiene and acrylonitrile and mixtures of at least two of them, intimately combined with an organic reaction product defined in claim 15.

20. A novel composition of matter comprising (II) a rubbery material selected from the group consisting of natural rubber, rubbery polymers of chloroprene, rubbery homopolymers of butadiene, rubbery copolymers of butadiene and styrene, rubbery copolymers of butadiene and acrylonitrile and mixtures of at least two of them, intimately combined with an organic reaction product defined in claim 16.

References Cited in the file of this patent

UNITED STATES PATENTS

| | | |
|---|---|---|
| 2,363,829 | Caplan | Nov. 28, 1944 |
| 2,461,508 | Harvey | Feb. 15, 1949 |
| 2,600,764 | Harvey | June 17, 1952 |